United States Patent [19]

Cerra et al.

[11] 3,881,765
[45] May 6, 1975

[54] BUS BODY

[75] Inventors: Anthony M. Cerra; Robert B. Kurre, both of Richmond, Ind.

[73] Assignee: Indian Head, Inc., New York, N.Y.

[22] Filed: Dec. 4, 1972

[21] Appl. No.: 311,694

[52] U.S. Cl..................... 296/28 A; 52/48; 105/401
[51] Int. Cl............................................ B62d 31/02
[58] Field of Search .......... 296/28 A; 105/397, 401; 52/46, 48

[56] References Cited
UNITED STATES PATENTS

| | | | |
|---|---|---|---|
| 2,502,320 | 3/1950 | Guernsey.......................... | 296/28 A |
| 2,685,263 | 8/1954 | Barnes et al............................ | 52/48 |
| 2,690,822 | 10/1954 | Meldrum ...................... | 296/28 A X |
| 2,758,870 | 8/1956 | Nallinger .......................... | 296/28 A |
| 3,186,755 | 6/1965 | Ward ................................ | 296/28 A |

FOREIGN PATENTS OR APPLICATIONS 709,027    5/1954    United Kingdom............... 296/28 A

*Primary Examiner*—Robert J. Spar
*Assistant Examiner*—L. J. Paperner
*Attorney, Agent, or Firm*—Brumbaugh, Graves, Donohue & Raymond

[57] ABSTRACT

A bus body comprises elongated, one-piece panels extending substantially the entire length of the body and defining exterior and interior body sides and roof. A multiplicity of generally U-shaped, one-piece rib members, spaced at intervals along the length of the body and coupled adjacent their ends to the bus floor in an inverted position, are located between the interior and exterior panels and are joined to all of the panels. A plurality of stringer members, located along the joints between the exterior roof panels and the joints between the interior roof panels, define elongated roof stringers that extend substantially the entire length of the bus body and are secured to substantially every rib member. The rib members, stringer members, and elongated panels afford a minimal number of body joints and present a minimal number of member and panel edges, thereby increasing the safety of passengers in the bus body in the event of a collision or upset.

11 Claims, 5 Drawing Figures

BUS BODY

BACKGROUND OF THE INVENTION

School bus bodies are often constructed of a large number of relatively small panels that extend between adjacent frame members. The frame members include a series of vertical side posts spaced at intervals along the sides of the bus body and connected to the corresponding posts on the opposite sides of the body by roof bows extending transversely across the body. The bus body floor is composed of flanged rectangular panels that extend between side posts and traverse the width of the body. The interior and exterior body walls are fabricated of flat, rectangular panels, each extending between two adjacent side posts and partially, or fully, along the height of the bus body between the floor and the window sill. The panels of the body roof, like the floor panels, extend between the side posts and roof bows and traverse the width of the body. The interior roof also may include headliner panels along the tops of the windows extending generally lengthwise of the body between adjacent side posts.

The above-described bus body construction permits mass production of substantially uniform panels which are used to fabricate the body floor, sides, and roof, thereby reducing production costs. At the same time, however, the number of panels increases the assembly costs for each body because fasteners must be placed at regular intervals around the periphery of each panel, a task requiring a great deal of time. Moreover, under impacts resulting from a collision, bus bodies tend to deform along the transverse and vertical joints between panels, exposing sharp edges that may injure passengers who are thrown by the impact. In a bus body comprising a substantial number of small panel members, it is inevitable that there will be a large number of transverse and vertical panel joints, presenting a substantial safety hazard in the event of a collision.

SUMMARY OF THE INVENTION

The present invention is a bus body comprising a plurality of elongated, one-piece body panels extending substantially the entire length of the bus body and defining exterior and interior body sides and roof. On the exterior of the body, the roof is defined by a medial and two marginal roof panels, the medial panel being lapped externally over the marginal panels. The exterior body walls of the bus are defined by exterior side panels, one panel extending along each side of the body. Inside the bus, the body roof is defined by two roof panels joined along the center of the bus. Two interior side panels extend along either side of the body, one panel on each side being located above and generally parallel to the other panel. The lower interior side panel on each side of the bus body has an integral flange projecting toward the interior of the bus for supporting a portion of a seat. The floor is formed in any appropriate manner.

The frame of the bus body is provided by a multiplicity of generally U-shaped, one-piece rib members, spaced at intervals along the length of the body. The ribs are coupled adjacent their ends to the body floor in an inverted position and are joined to the panels. A plurality of stringer members are arranged along the joints between the exterior roof panels and the joint between the interior roof panels, defining elongated roof stringers extending substantially the entire length of the bus. Each elongated roof stringer is secured to substantially every rib member. In cross-section, both the rib and stringer members have a rectilinear central portion and a flange portion at each end of and at right angles to the central portion. The flanges extend away from the central portion in opposite directions, permitting the exterior body panels readily to be secured to one flange and the interior panels to be secured to the second flange.

The elongated panels in a bus body constructed according to the present invention significantly reduce the total length of panel edges in the body, thereby reducing assembly time. The reduced number of panel edges and the fact that the panels, rather than the fasteners by which the panels are secured to the frame members, sustain the longitudinal tensile stresses that tend to rupture the bus walls and roof increases the safety of passengers in the bus body in the event of a collision or upset. Moreover, as the panels extend lengthwise of the bus, the panel joints are generally longitudinal and the total length of transverse and vertical joints, potentially more dangerous than longitudinal joints, is reduced to an even greater extent.

BRIEF DESCRIPTION OF THE DRAWINGS

For a better understanding of the invention, reference may be made to the following description of an exemplary embodiment, taken in conjunction with the figures of the accompanying drawing, in which.

DESCRIPTION OF AN EXEMPLARY EMBODIMENT

Figure 1:
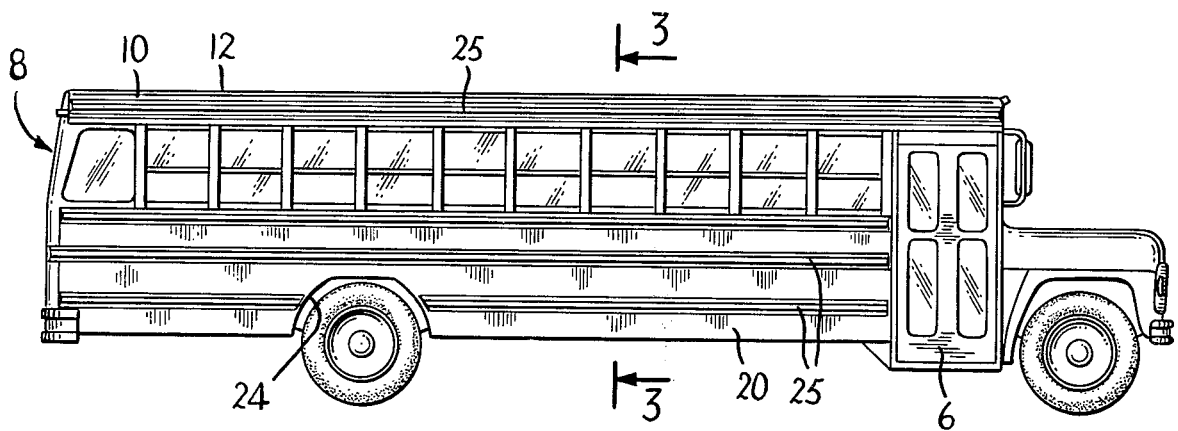
FIG. 1 is a side view of a bus having a body constructed according to the invention.
Figure 2:
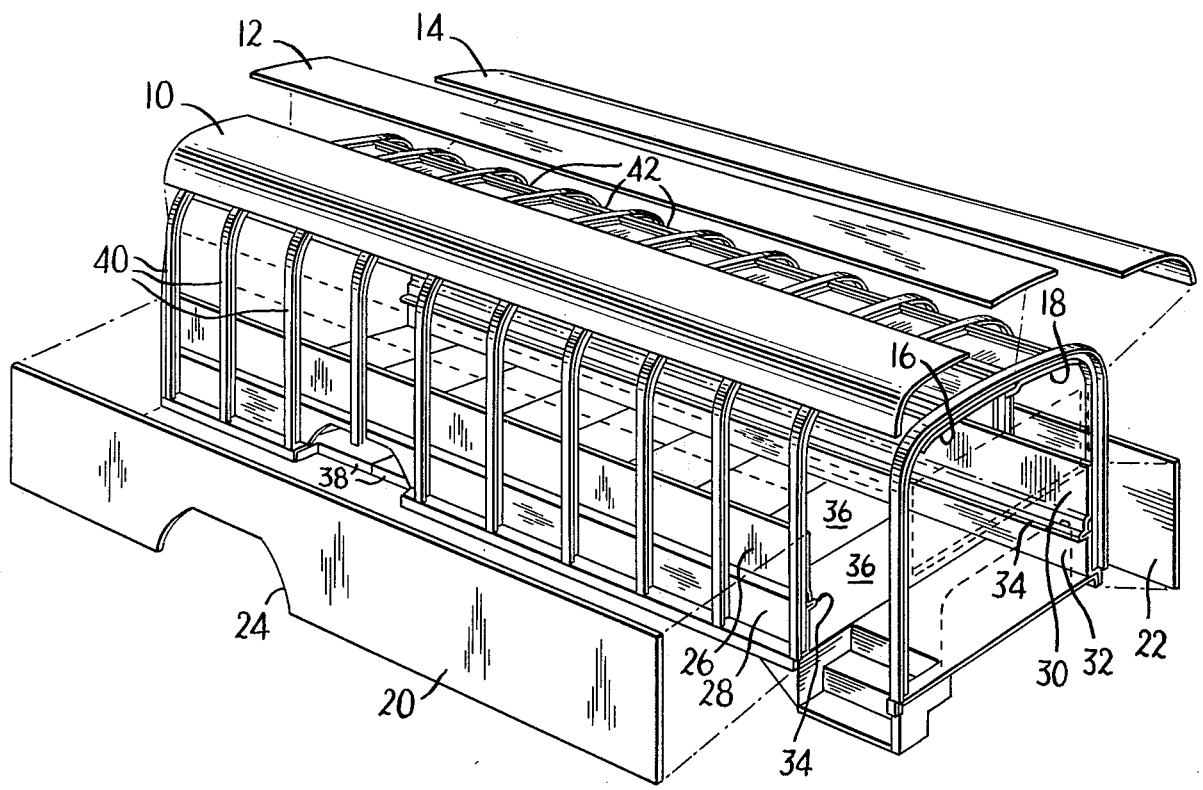
FIG. 2 is an exploded pictorial view of the bus body of FIG. 1.

The invention is concerned primarily with the main structural portion of a bus body, beginning at the front door 6 and ending near the rear assembly 8. The main body section is modular, as in previously known and used bus bodies, in that it is composed of any suitable number of identical bays or sections that extend between adjacent pairs of frame members.

The exemplary embodiment includes three elongated, one-piece exterior roof panels 10, 12 and 14, that extend the entire length of the bus body and define an exterior body roof. The central or medial panel 12 is substantially flat and its edges externally overlap the edges of the marginal roof panels 10 and 14 (see FIG. 3). The marginal panels 10 and 14 are pre-bent laterally to match the roof contour and facilitate the union of the roof to the sides of the bus body. The roof structure also includes two elongated, one-piece interior roof panels 16 and 18, that extend the length of the bus body. Although the roof panels 10, 12, 14, 16 and 18 are shown extending the entire length of the passenger compartment, it is within the scope of the invention to have the panels extend only from the rear assembly 8 of the bus to a point just behind the driver's seat and front door 6 and to have separate panels above the driver's compartment.

The two exterior side walls of the bus body include two elongated, one-piece exterior side panels 20 and 22, one on either side, extending the entire length of the body. Each of the panels 20 and 22 has a wheel opening 24. Onepiece guard rails 25 are fastened to the panels 20 and 22 at vertically spaced intervals for additional strength in the event of a side collision. Inside, four elongated, onepiece interior side panels extend the length of the body and define the interior body walls. Each interior wall of the body comprises a lower interior panel 28 (or 32) and an upper interior panel 26 (or 30). The lower panels 28 and 32 have integral, inwardly turned flanges 34 adjacent their upper edges just below the point where they meet the upper side panels 26 and 30. The flanges 34 support the outboard end of each seat (not shown) and eliminate the necessity for a separate bracket or outboard legs. The exterior side panels 20 and 22 are separated by the body ribs (described below) from the interior view panels 26, 28, 30 and 32 over most of their respective heights, but the lower portions of the lower interior side panels 28 and 32 are bent out and then down adjacent the floor of the bus body, the lower portions of the respective exterior and interior panels abutting (See FIG. 3). The upper and lower edges of the upper interior side panels 26 and 30 are doubled over for increased strength and to eliminate sharp edges on the inside walls, and the lower edges of the upper interior side panels 26 and 30 also overlap the upper edges of the lower interior side panels 28 and 32.

The floor of the body is composed of a plurality of generally identical rectangular floor panels 36, each of which extends transversely entirely across the body. Each floor panel 36 has an integral flange 38 that projects perpendicularly from the entire periphery of the panel 36. The flanges 38 permit the floor panels 36 conveniently to be fastened together and, further, permit the exterior side panels 20 and 22 and the interior side panels 26, 38, 30 and 32 to be fastened to the floor panels 36.

A mutiplicity of U-shaped, one-piece ribs 40, spaced at equal intervals along the length of the body, are coupled adjacent their ends to the floor of the bus body in an inverted position. As shown, the ribs 40 are secured to the lower portions of panels 28 and 32, which are, in turn, secured to the floor panels 36. It is within the scope of the invention, however, to couple the ribs 40 to the floor in any appropriate manner. The ribs 40 are located between the exterior panels 10, 12, 14, 20 and 22 and the interior panels 16, 18, 26, 28, 30 and 32 and are joined to all of the panels.

To further strengthen the roof, a plurality of longitudinal stringer members 42 are located along the joints between the exterior roof panels 10, 12 and 14 and the joint between the interior roof panels 16 and 18, each member extending between each adjacent pair of ribs. The aligned stringer member 42 together form elongated roof stringers that extend the entire length of the bus body and are secured to every rib 40.

Both the ribs 40 and stringer members 42 are Z-shaped in cross-section. For example, each stringer has a rectilinear central portion 44 and flange portions 46 and 47 at each end at right angles to the central portion 44. The flanges 46 and 47 extend away from the central portion 44 in opposite directions to permit the exterior body panels 10, 12, 14, 20 and 22 to be secured to the outwardly disposed flange 47, while the interior panels 16, 18, 26, 28, 30 and 32 are secured to the inwardly disposed flange 46. The corresponding flanges of intersecting ribs 40 and stringer members 42 are fastened together in a similar manner.

Figure 3:
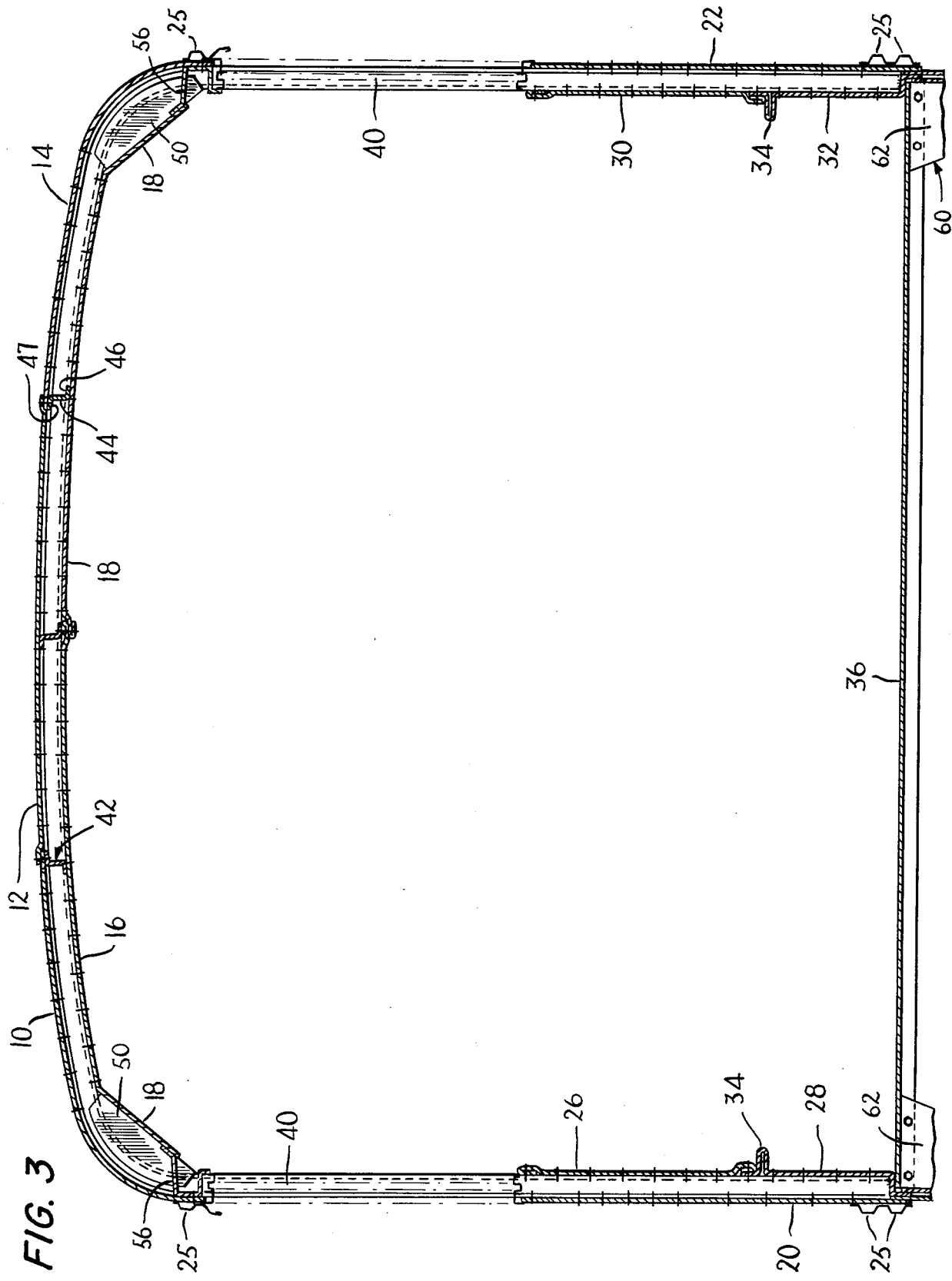
FIG. 3 is a typical cross-sectional view of the bus body of FIG. 1, taken along view line 3—3 of FIG. 1.
Figure 4:
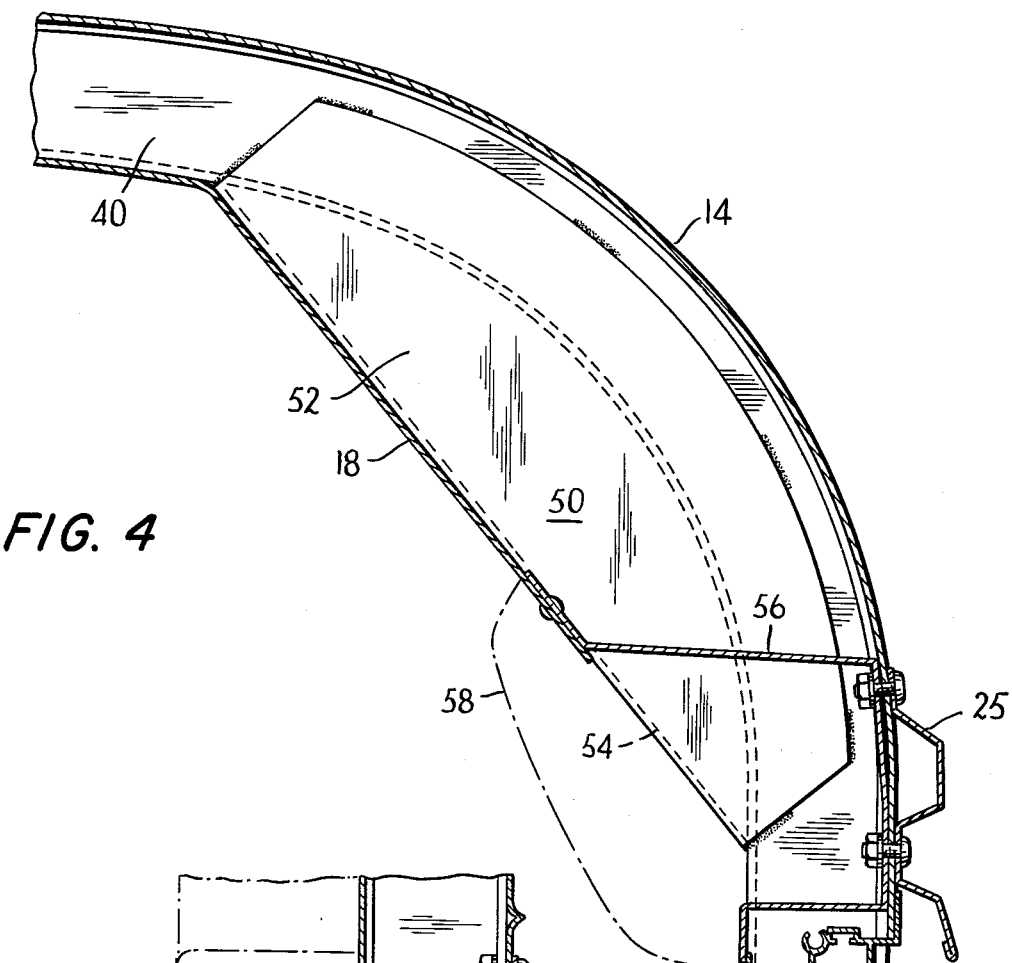
FIG. 4 is an end cross-sectional view of a corner of the bus body where the side walls meet the roof, the view being on a larger scale than FIG. 3.

Although it is unnecessary to do so, it is advantageous further to strengthen the bus body by installing, as shown in FIGS. 3 and 4, a gusset 50 at each of the upper corners of each rib 40 where the roof portion curves to meet the side wall portions. Each gusset 50 includes a web portion 52 shaped in plan at the outer extremity generally to match the curvature of the rib and having a substantially straight inner edge formed with a right angle flange 54. Each gusset 50 is welded (or riveted or bolted) to the web portion of the rib. The interior roof panel 18 is bent downwardly and outwardly to follow the flange 54 of the gusset and is appropriately fastened to the flange 54. Specially shaped longitudinal stringers 56 are installed between adjacent ribs and define an internally open box that accommodates lighting fixtures associated with lighting panels 58 (illustrated in phantom lines in FIG. 4).

Figure 5:
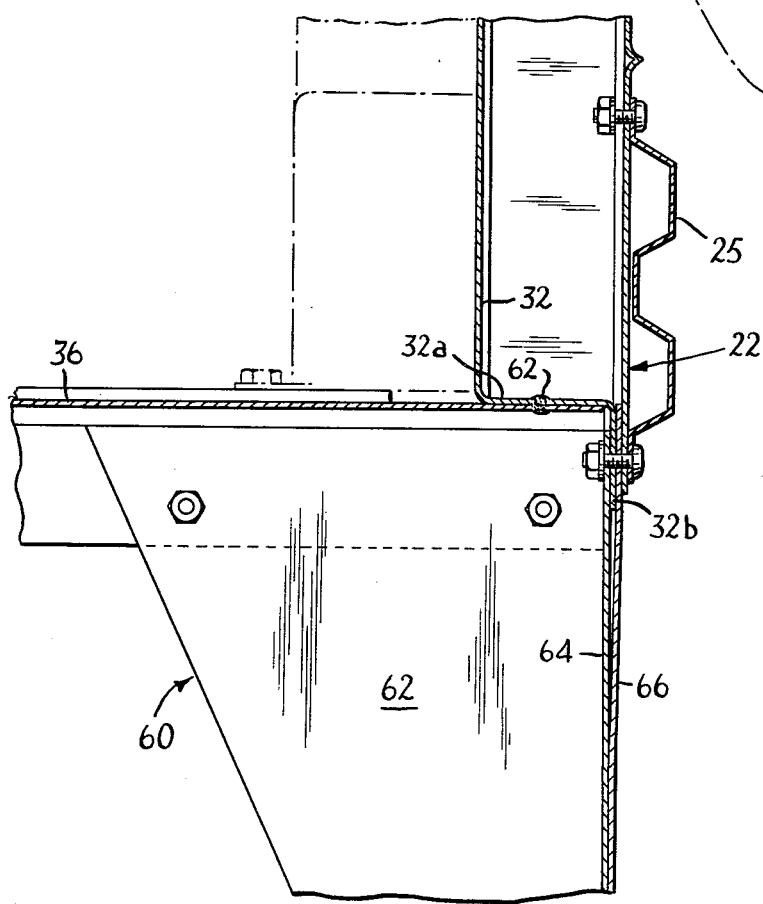
FIG. 5 is an end cross-sectional view of a lower corner of the bus body where the side walls meet the floor, the view being on a larger scale than FIG. 3.

FIG. 5 illustrates in greater detail the joint used at each lower corner of the body where the side walls meet the floor and the under body portion of the bus. Each lower interior side wall panel (e.g., panel 32) has an L-shaped flange that includes a portion 32a that extends horizontally outwardly and abuts the floor panel 36 and a vertical portion 32b that extends downwardly from the end of the portion 32a and overlaps the upper end of an underbody gusset 60. The portion 32a of the L-shaped flange is welded to the floor panel 36 by weldments 62. Each gusset 60 extends downwardly from the flanges of adjacent floor panels 36 and includes a web portion 62 of generally triangular shape in plan that is appropriately fastened to the flanges of the floor panels 36 and a right angle flange 64 along the outer edge of the web portion 62. The sides of the underbody part of the bus body are faced with one or more panels 66 (or doors for luggage carriers) that are appropriately secured to the flange portions 64 of the gussets 60. The lower end of each exterior side panel (e.g., the panel 22) overlaps the upper end of the underbody facing panel 66.

The members and panels may be fastened together by any convenient means, but the shape of the ribs 40 and stringer members 42 is particularly suitable for use of ratchet-like fasteners, styled "Huckbolts," the heads of which are tightly drawn up against the members or panels by a gun that engages the shanks of the fasteners and tensions them.

It will be understood that the above-described embodiment is merely exemplary and that those skilled in the art may make many variations and modifications without departing from the spirit and scope of the invention. All such modifications and variations are intended to be within the scope of the invention as defined in the appended claims.

I claim:

1. A bus body comprising at least two elongated one-piece exterior roof panels extending substantially the entire length of the bus body and defining an exterior body roof, at least two elongated one-piece interior roof panels extending substantially the entire length of the bus body and defining an interior body roof, at least two elongated one-piece exterior side panels extending substantially the entire length of the bus body, one on either side thereof, and defining exterior body walls, at least two elongated one-piece interior side panels extending substantially the entire length of the bus body, one on either side thereof, and defining interior body walls, at least one floor panel defining an elongated body floor, at least three generally U-shaped one-piece rib members spaced at intervals along the length of the body and coupled adjacent the ends of said rib members to the body floor in an inverted position, the rib members being located between the interior and exterior side panels and between the interior and exterior roof panels and being joined to said panels, a gusset secured to each upper corner of each rib where the roof portion of the rib meets the respective side wall portion of the rib, each gusset having a right angle flange portion along an inwardly disposed edge thereof and each interior roof panel being shaped to match the shape of said flange portion of the respective gusset and being joined thereto, and upper side wall stringers installed between adjacent ribs, each stringer being generally U-shaped in cross section to define an inwardly open space and having a flange portion joined to a corresponding interior roof panel adjacent the outward margin thereof, the rib members and elongated panels affording a minimal number of body joints and presenting a minimal number of member and panel edges, thereby increasing the safety of passengers in the bus body in the event of a collision or upset.

2. A bus body according to claim 1, wherein there are four interior side panels, two on either side of the body, a first panel on each side of the body being located above and generally parallel to a second panel.

3. A bus body according to claim 2, wherein the second interior side panel on each side of the body has an integral flange projecting toward the interior of the bus for supporting a portion of a seat thereon.

4. A bus body according to claim 2, wherein the interior side panels are laterally spaced from the exterior side panels and a portion of each second interior side panel is formed to extend generally perpendicularly toward the corresponding exterior side panel adjacent the body floor and subsequently to extend parallel to said corresponding exterior panel, adjacent thereto and substantially covered thereby.

5. A bus body according to claim 1, wherein each rib member in cross section has a rectilinear central portion and a flange portion at each end of and at right angles to the central portion, the flange portions extending away from the central portion in opposite directions.

6. A bus body according to claim 5, wherein the exterior roof and side panels are secured to one flange portion of each rib member and the interior roof and side panels are secured to the second flange portion of each rib member.

7. A bus body according to claim 1, further comprising at least one roof stringer member defining an elongated roof stringer extending substantially the entire length of the bus body, the roof stringer being secured to substantially every rib member and being located adjacent a roof panel.

8. A bus body according to claim 7, wherein roof stringer members are located along joints between exterior roof panels and joints between interior roof panels.

9. A bus body according to claim 1, wherein one medial exterior roof panel and two marginal exterior roof panels are provided, the medial panel being lapped externally over the marginal panels.

10. A bus body according to claim 1 wherein each interior side panel includes along the lower edge thereof a generally L-shaped flange having a horizontal portion disposed substantially at right angles to the major wall portion of the panel and abutting a zone of the floor panel along the lateral edge of the floor panel and a vertical portion extending downwardly from the horizontal portion, and wherein the respective free ends of each rib are supported on and are joined to the horizontal portion of the respective interior side panel.

11. A bus body according to claim 1, further comprising an underbody qusset joined to the floor panel generally at each rib located along the length of the bus body, each underbody gusset including a right angle flange along the outer edge thereof generally coplanar with the respective exterior wall panel of the body, and at least one facing member on each side of the body joined to the respective underbody gusset along said outer edge.

* * * * *